March 10, 1959  L. R. BEACH, JR., ET AL  2,876,640
PRESSURE MEASURING DEVICE

Filed April 2, 1956  4 Sheets-Sheet 1

INVENTORS.
LAURENCE R. BEACH, Jr.
KENDRICK RADEY
DAVID J. GILDEA
WILLIAM E. STROHMEYER
BY
ATTORNEY

March 10, 1959

L. R. BEACH, JR., ET AL 2,876,640

PRESSURE MEASURING DEVICE

Filed April 2, 1956

INVENTORS.
LAURENCE R. BEACH, Jr.
KENDRICK RADEY
DAVID J. GILDEA
WILLIAM E. STROHMEYER

BY

William R Lane

ATTORNEY

March 10, 1959

L. R. BEACH, JR., ET AL 2,876,640

PRESSURE MEASURING DEVICE

Filed April 2, 1956

INVENTORS.
LAURENCE R. BEACH, Jr.
KENDRICK RADEY
DAVID J. GILDEA
WILLIAM E. STROHMEYER

BY

*William R Lane*

ATTORNEY

March 10, 1959 L. R. BEACH, JR., ET AL 2,876,640
PRESSURE MEASURING DEVICE
Filed April 2, 1956

INVENTORS.
LAURENCE R. BEACH, Jr.
KENDRICK RADEY
DAVID J. GILDEA
BY WILLIAM E. STROHMEYER

ATTORNEY

United States Patent Office 2,876,640
Patented Mar. 10, 1959

2,876,640

PRESSURE MEASURING DEVICE

Laurence R. Beach, Jr., Kendrick Radey, and David J. Gildea, Whittier, and William E. Strohmeyer, Fullerton, Calif., assignors to North American Aviation, Inc.

Application April 2, 1956, Serial No. 575,671

6 Claims. (Cl. 73—182)

This invention relates to a device for measuring gaseous pressure. More specifically, this invention relates to a device for measuring the ambient air pressure through which an aircraft is passing.

A number of different devices are known in the art for measuring air pressure. For example, Pitot measuring devices or probes are known for indicating air speeds. However, the development of an instrument for measuring the ambient pressure of the medium through which an aircraft is passing has presented a number of problems. For example, one problem is to design an instrument for measuring the static air pressure which will be insensitive to angular misalignment to the air stream. Conventional aircraft flying at subsonic speeds use a cone-cylinder type of probe to measure static pressure. This instrument fails at supersonic speeds, however, due to its sensitivity to angular air flow. One instrument proposed for measuring air pressure at supersonic velocity consists of a sharp wedge-shaped body with an orifice in one side very near the edge. The orifice is perpendicular to the surface of the wedge and the wedge is placed parallel to the stream lines of the air flow. This instrument, however, is very sensitive to angle of contact with the air stream. A need exists therefore for a static pressure measuring device which is insensitive to angle of air flow.

It is therefore an object of this invention to provide a novel static pressure measuring device or probe.

It is also an object of this invention to provide an instrument for measuring the ambient pressure of the air through which an aircraft is passing.

It is likewise an object of this invention to provide an instrument for measuring static pressure which will operate satisfactorily over a wide range of Mach numbers.

Another object of our invention is to provide a static pressure measuring device which is relatively insensitive to changes over a considerable range of angle of attack.

It is also an object of this invention to provide a static pressure measuring device which is relatively insensitive to deviations in the angle of yaw.

Another object of this invention is to provide a pressure measuring device which has an air flow capacity sufficient to meet the time lag requirements of high speed aircraft.

It is likewise an object of this invention to provide a pressure measuring device capable of withstanding air loads and temperatures encountered in high velocity flight conditions.

The above and other objects of this invention will become apparent from the following description taken in conjunction with the accompanying drawings, in which Fig. 1 is a side view of the front section of an aircraft capable of supersonic flight, illustrating an installation of the ambient pressure measuring device or probe of this invention;

Figure 8:
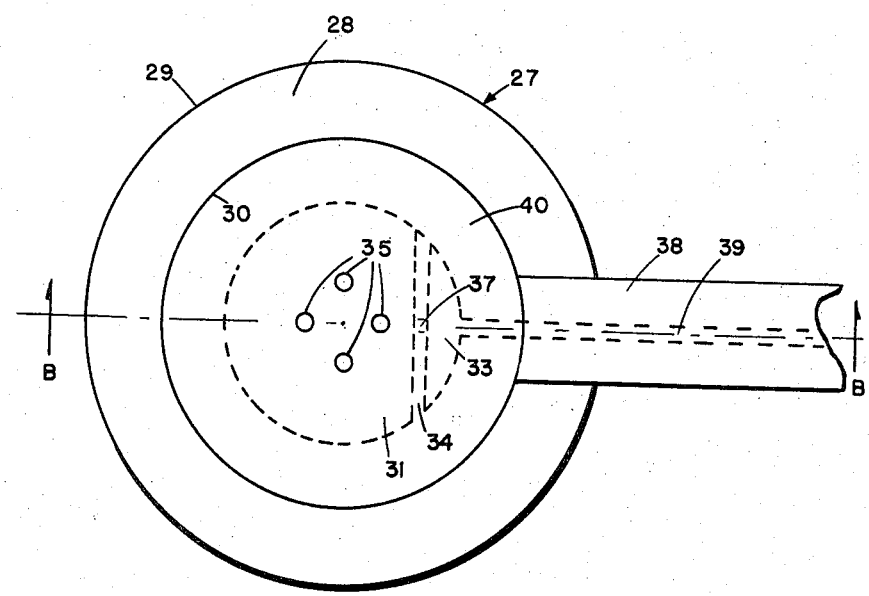
Fig. 8 is a side view of still another embodiment of the static air pressure measuring device of this invention.
Figure 10:
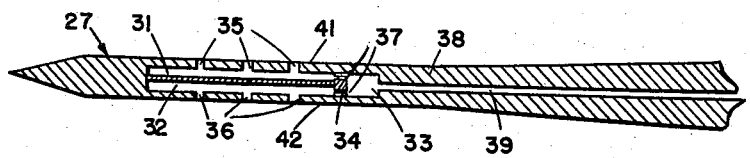

And Fig. 10 is a section view of the pressure measuring device of Fig. 8 taken along the line B—B.

Figure 1:
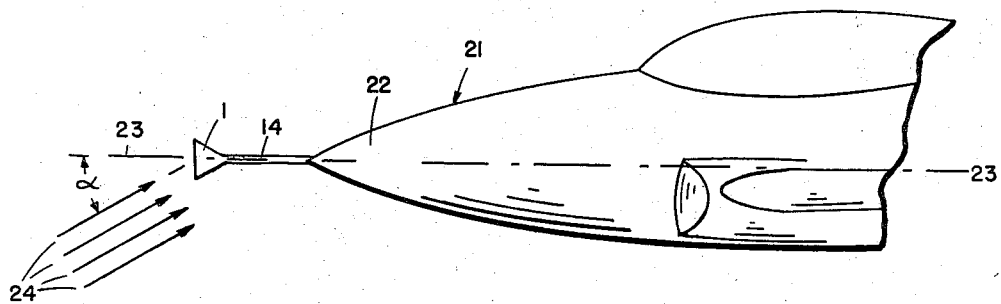

A typical installation of the invention is illustrated in Fig. 1, showing the front section of an aircraft 21, which is capable of supersonic flight, with the pressure measuring device 1 of this invention attached by a tubular section 14 to the forepart 22. The longitudinal substantially horizontal axis of the fuselage is designated 23—23. When the plane is in flight, the surrounding air, indicated by arrows 24, will strike the fuselage and the pressure measuring device at a certain angle $\alpha$ with respect to the line 23—23, called the angle of attack. The probe is so oriented that a plane, centrally located between the flat outer surfaces of the probe, is normal to a plane passing through the wing span of the aircraft.

Figure 2:
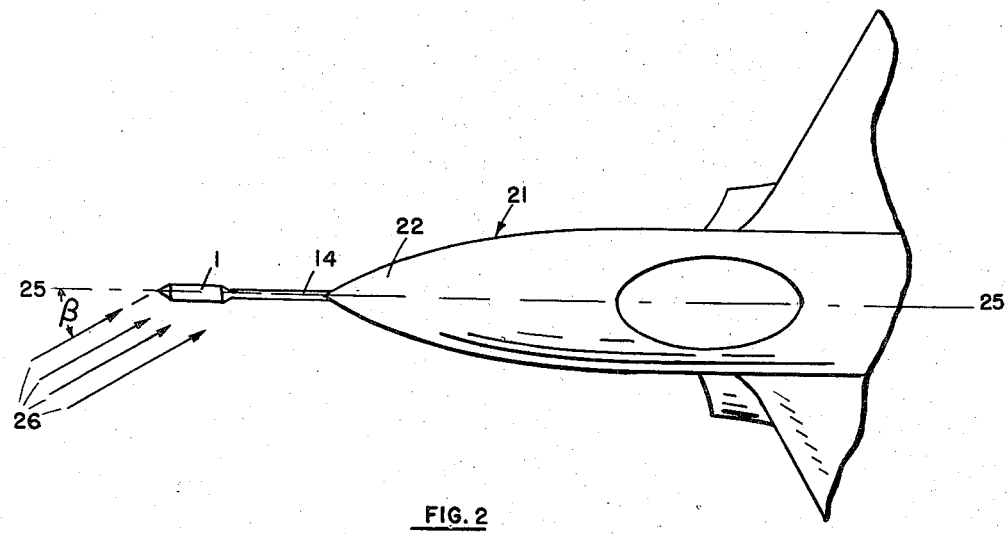
Fig. 2 is a top view of the aircraft of Fig. 1.

Fig. 2 is a top view of the aircraft of Fig. 1, showing the pressure measuring device 1 attached by the tubular section 14, to the forepart 22 of the aircraft 21. The lateral axis passing through the pressure measuring device is designated 25—25. When the aircraft is in flight, the surrounding air indicated by arrows 26 may strike the aircraft and also the pressure measuring device or probe from the side at a certain angle. This angle is called the angle of yaw and is measured as the angle $\beta$ with respect to the line 25—25.

Figure 3:
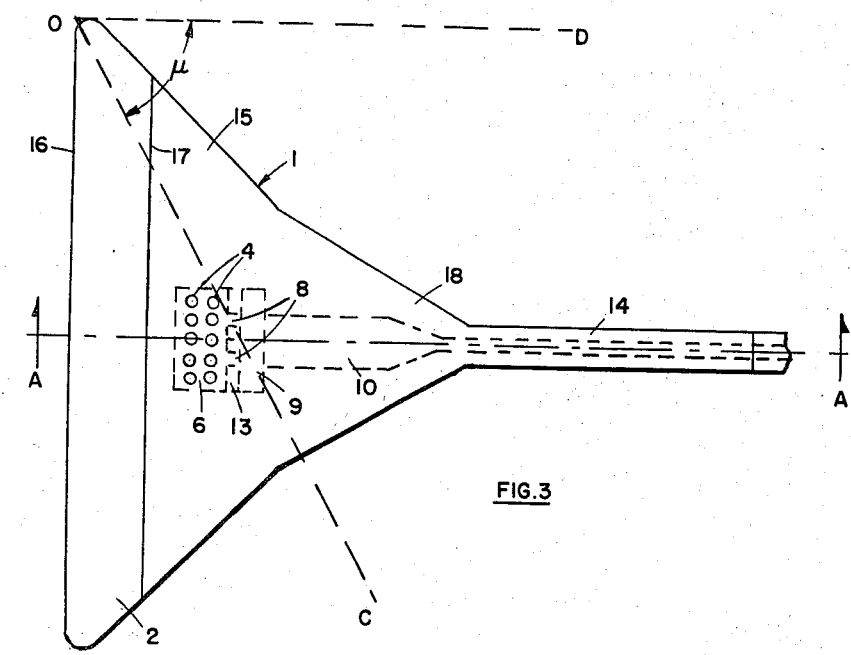
Fig. 3 is a side view of one embodiment of the static air pressure measuring device of this invention.

Fig. 3 is a side view of one embodiment of the pressure measuring device or probe of this invention. The instrument 1, has a reverse delta planform and comprises a leading section 2, which forms the base of the reverse delta and is in the shape of a wedge having its base at the line 17 and ending in a sharp edge 16; a thin flat plate-like body 15 which narrows down as the distance from the leading edge 16 increases; a heavier support section 18 which narrows down from the body 15; and a tubular connecting section 14. The body 15 of the probe contains a large internal chamber which is subdivided by partition members into smaller compartments or enclosures. The large internal chamber is shown in Fig. 3 by dotted lines in the form of a square. The large chamber is divided so as to contain a first internal chamber 6, and a second internal chamber (not shown) which lies directly below 6. The first and second internal chambers open into a third internal chamber or compartment 9, through conduit means 8 in partition member 13. A plurality of apertures 4, in the upper surface of the body 15, lead to internal compartment 6. In like manner, there are a plurality of apertures in the opposite, lower surface of the body (not shown) which lead to the second internal chamber (also not shown) which lies directly below chamber 6. Internal chamber or compartment 9 is connected to a static pressure line 10 which leads through the connecting section 18 and out through a tubular connecting section 14. The instrument is connected to a pressure indicating device (not shown) within the aircraft.

Figure 4:
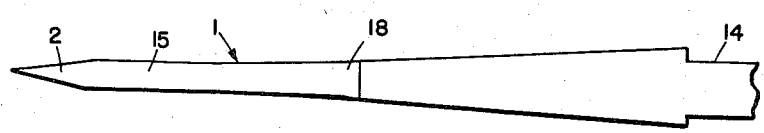
Fig. 4 is a top view of the pressure measuring device of Fig. 3.

Fig. 4 represents a top view of the instrument shown in Fig. 3. In this view, 1 is the pressure measuring device having a sharp wedge-shaped leading section 2, a thin plate-like body 15, a thickened support section 18 and a tubular connecting means 14.

Figure 5:
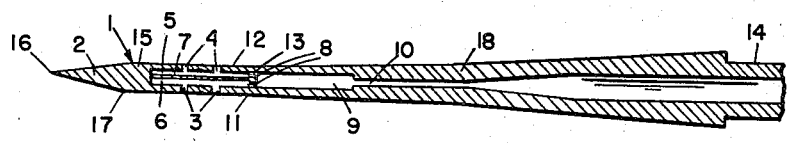
Fig. 5 is a section view of the pressure measuring device of Fig. 3 taken along the line A—A.

Fig. 5 is a cross-sectional view of the instrument of Fig. 1 along the line A—A. The body 15 of the instrument has two substantially parallel flat outer surfaces 11 and 12. Between these two flat outer surfaces is located an internal chamber 5—6—9 which is subdivided by means of partition members. A first partition member 13 is positioned so as to divide the chamber into a first compartment 9 and a second enclosure 5—6. A second partition member 7 is positioned in the second enclosure 5—6 in a plane centrally located between the flat outer surfaces 11 and 12, so as to divide it into a second compartment 5 and a third compartment 6. The total number of internal compartments is three, designated here as a first compartment 9, a second compartment 5 and a third compartment 6. The second and third compartments have a plurality of conduit means 8 leading through the first partition member 13 to the first compartment 9. The second compartment 5 has a plurality of apertures 4 leading to the adjacent flat outer surface 12. The third compartment 6, likewise has a plurality of apertures 3, leading to the other flat outer surface 11. A static pressure line 10 leads from the first compartment 9 through the heavier support section 18 and out through the tubular connecting section 14 to a pressure indicator (not shown).

Figure 6:
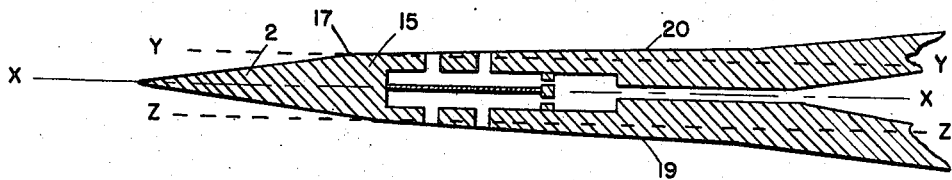
Fig. 6 is a section view of a modified pressure measuring device.

Fig. 6 shows another embodiment in the structure of a pressure measuring device of this invention. The structure of the instrument shown in Fig. 6 is substantially the same as that shown in Fig. 5 except that the sides 19 and 20 diverge outwardly from the base 17 of the wedge-shaped section 2, of the probe. The outer surface 20 makes a diverging ramp of up to 2° with a plane Y—Y which is parallel to plane X—X. The latter plane is centrally located between the flat surfaces 19 and 20 and is in the plane of the leading edge. Lines Y—Y and Z—Z indicate planes parallel to X—X passing through the junction of the tapered sides of the leading edge 2 and the surfaces of the body 15. Side 19 forms a similar ramp with the plane X—X (or Z—Z) on the opposite side.

Figure 7:
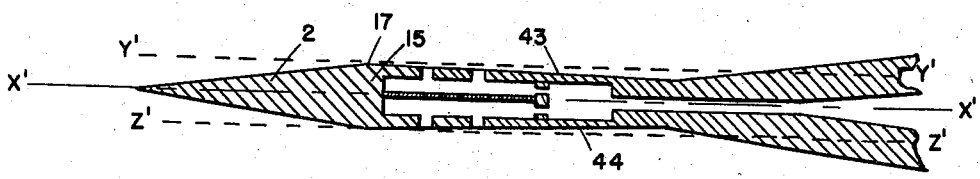
Fig. 7 is a section view of another modification of the pressure measuring device.

Fig. 7 shows another embodiment in the structure of a pressure measuring device of this invention. The structure of the instrument shown in Fig. 7 is substantially the same as that shown in Fig. 5 except that the sides 43 and 44 converge inwardly from the base 17 of the wedge-shaped section 2, of the probe. In other words, the structure of Fig. 7 differs from that of Fig. 6 in that the sides of the body of the probe converge, instead of diverge, from the base 17 of the wedge-shaped section 2. The outer surface 43 makes a converging ramp of up to 2° with the plane Y'—Y' which is parallel to a plane which is centrally located between the flat surfaces 43 and 44 and which is in the plane of the leading edge. The centrally located plane is indicated by X'—X'. Lines Y'—Y' and Z'—Z' indicate planes parallel to X'—X'. Side 44 forms a similar converging ramp with the plane Z'—Z' on the opposite side of the probe.

Fig. 8 shows a side view of a pressure measuring device 27, of this invention having a pancake planform, which is connected by a tubular section 38 to an aircraft (not shown). The outer peripheral section 28 of the probe is in the shape of a wedge having its base along the circular line 30 and having a sharp leading edge 29. The central section 40 of the pancake shaped probe, bounded by the line 30, is thin and flat and contains internal chambers or enclosures which are outlined by dotted lines. Enclosure 31, and also another enclosure directly beneath it, are connected by conduits 37, running through partition member 34, to a compartment 33. A plurality of apertures 35 lead from internal compartment 31 to the outer surface of the instrument body 40. A static pressure line 39 leads from compartment 33 to a pressure indicating instrument in the aircraft (not shown).

Figure 9:
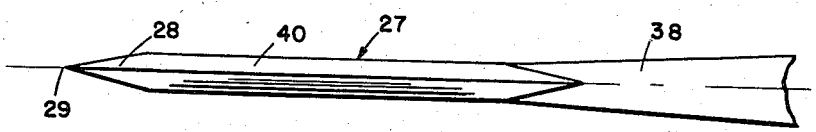
Fig. 9 is a top view of the pressure measuring device of Fig. 8.

Fig. 9 gives a top view of the instrument 27, of Fig. 8, showing the sharp wedge-shaped peripheral section 28, the thin plate-like body 40, and the heavier tubular section 38.

Fig. 10 gives a section view of the pancake shaped pressure probe 27 of Fig. 8 taken along B—B. The internal construction is substantially the same as that shown in Fig. 5 for the reverse delta-shaped probe. A large internal chamber embodying compartments 31, 32 and 33, is located between the flat parallel outer surfaces 41 and 42. A first internal compartment 31 and a second internal compartment 32 are connected, by conduits 37 in partition member 34, to a third internal compartment 33. Internal compartments 31 and 32 have a plurality of apertures 35 and 36, leading to the external surfaces 41 and 42, respectively. A static pressure line 39 leads through the tubular section 38 of the instrument and is adapted to connect the internal compartment 33 with a pressure indicator in the aircraft (not shown).

The probe may be constructed of metal or other suitable material. The overall size of the probe is not too critical and need only be large enough to contain the three internal chambers as shown in the diagram. The volumes of the chambers in the instrument are also not critical. The volumes of the enclosures which have apertures leading to the outer surfaces should be approximately equal to give best pressure readings, however, this also is not too critical. The ratio of the volumes of the two enclosures having apertures leading to the outer surfaces to the volume of the third compartment which is connected to the static pressure line can vary over wide limits. In Fig. 5 this ratio would be represented by the ratio of the volumes (5+6):9. The ratio of the cross-sectional area of the apertures-to-the cross-sectional area of the conduit means can vary from about 2:1 to about 20:1. A ratio of about at least 2:1 is necessary to provide for rapid equilibration of pressures in the several internal compartments with the ambient pressure of the surrounding gaseous medium. The probe functions well when the ratio is as high as 20:1. Increasing the ratio still further gives no particular advantage.

The pressure probe of this invention, constructed according to the above specification, is found to have negligible time lag. Also, it measures the ambient air pressure through which the instrument is moving even when the angle of yaw is as high as ±6°.

A preferred embodiment of this invention comprises a probe having a reverse delta planform in which the length of the sharp leading edge is such that the angle $\mu$, shown in Fig. 3, formed by (1) a line drawn from one extremity of said leading edge to the periphery of any of the apertures in the surface (line O—C in Fig. 3), and (2) a line OD drawn perpendicular to the leading edge in the plane of said surface and intersecting the first line at the leading edge, is defined in terms of the relationship, $\sin \mu = 1/M$. In this equation, M is the lowest supersonic Mach number at which it is desired to have the probe accurately measure static pressure. In other words, in a probe in which the apertures (4, in Fig. 3) are located at a preselected distance from the leading edge, the length of the leading edge should be such that the apertures lie fore of the sector COD containing the angle $\mu$. When this relationship exists, the apertures will be in front of the shock waves originating at the ends or tips of the leading edge. For example, when the apertures are located 2.5 inches back of the leading edge and it is desired to have the probe measure static pressure accurate at Mach 1.1, the leading edge should be 10.5 inches long in order that $$\sin \mu = \frac{1}{1.1}$$

or 0.91. This probe will also accurately measure static or ambient air pressure at Mach numbers above 1.1 since the apertures will be in front of the shock wave. The probe will likewise measure static pressures at Mach numbers below 1.1 but an error will be introduced into such pressure measurements.

The probe having the leading edge as described in the previous paragraph gives good measurements even when the angle of attack is in excess of ±12°.

Another embodiment of our invention comprises a wedge-type static pressure probe having a reverse delta planform as shown in Figs. 6 and 7 in which the two flat outer surfaces of the body 15 diverge outwardly or converge inwardly from the base of the sharp wedge-shaped leading edge 2, each making an angle of up to about ±2° with a plane which is centrally located between the flat surfaces and which is in the plane of the leading edge. When the flat surfaces 19 and 20 diverge as shown in Fig. 6, making an angle of from about 0.10 to about 2° with a centrally located plane, more accurate readings of the static pressure are obtained when the instrument is moving through the gaseous medium at Mach numbers of from about 1.1 to about 1.5. When it is desired to measure static pressure very accurately at Mach numbers from about 1.7 to about 3.0, it is preferred that the two flat surfaces 43 and 44 converge as shown in Fig. 7, making an angle from about 0.1° to about 2° with a centrally located plane. For measuring static pressures of the surrounding gaseous medium very accurately at Mach numbers up to 1.1 and in the range of from about 1.5 to about 1.7, it is preferred that the flat surfaces be parallel to each other as shown in Fig. 5. Thus, for a given range of ramp angles, very accurate readings are obtained over a particular range of Mach numbers. However, with a probe in which the flat surfaces make a particular ramp angle, static pressures can still be measured over a large Mach number range fairly accurately, except that the pressure measurement will contain a certain degree of error at all Mach numbers other than those within the range for which the probe was designed.

The leading section 2 of the pressure probe is tapered to a sharp edge 16 as illustrated in Fig. 5. This construction is used in order to avoid a detached shock occurring in front of the leading edge which would change the value of the pressure just in front of the instrument. The degree of taper required varies with the Mach numbers at which the instrument is to be used. As the Mach number increases, the degree of taper of the leading edge should be decreased, that is, the point of the leading edge should be sharper. However, a leading edge having a small degree of taper also serves well at low Mach numbers. Therefore, it is advantageous to construct the instrument so that it has a leading edge with a small degree of taper. For good results, the degree of taper of the leading edge can vary from about 1° to about 8°. For measurements at Mach numbers above one, it is preferred to have the degree of taper within the range of from about 1° to about 6°. For example, a probe of this invention having a leading edge with a 4° taper is satisfactory for measurements at Mach numbers as high as 1.4.

An alternative embodiment of our invention comprises a static pressure probe having a pancake planform as illustrated in Figs. 8-10. The edge of the circular probe is also tapered and sharp, having the same characteristics as the edge of the reverse delta probe. The internal chambers or compartments are arranged in much the same manner as in the wedge-type probe. The circular pancake-shaped probe gives measurements of static pressure of an accuracy equivalent to that obtained with a wedge-shaped probe.

The operation of the instrument of this invention can best be described with reference to Fig. 5. As the probe moves forward through a gaseous medium, the pressure in each of the compartments 5 and 6 tends to equalize with the pressures on that external surface 11 and 12 of the pressure measuring device to which the compartment is connected by the apertures 3 or 4. Thus, when the instrument is moving forward so as to meet the air or gaseous medium at an angle β in a plane perpendicular to the plane of the instrument, as shown in Fig. 2, say on the side in which the apertures 4 are located, the pressure on that side will be greater than the pressure on the opposite side where the apertures 3 are located. The pressure in split chamber or compartment 5 will tend to equilibrate with the pressure on the side 12. Meanwhile, the pressure in compartment 6 will tend to equilibrate with the pressure exerted on the side 11. Since the instrument is moving forward so as to meet the air adjacent to side 12 at an angle in a plane perpendicular to the plane of the instrument, the pressure on that side will be greater than the ambient pressure, while the pressure on the surface of side 11 will be less than the ambient pressure. Consequently, the pressure in compartment 5 will be greater than the ambient pressure while the pressure in compartment 6 will be lower than the ambient pressure. The pressures in enclosures 5 and 6 will tend to equilibrate with the pressure in compartment 9. Thus, there will be a flow of the gaseous medium from compartment 5 to compartment 9 through the connecting conduit means 8, increasing the pressure in chamber 9. The pressure in compartment 9 being higher than the pressure in compartment 6, under the above stated conditions, there will be a flow of the gaseous medium from compartment 9 to compartment 6. The pressure in compartment 9, therefore, will represent an average of the pressures found in compartments 5 and 6 which, in turn, represents to a reasonable degree of accuracy the ambient pressure of the medium through which the measuring device is moving. This ambient or static pressure in compartment 9 is then communicated to a pressure indicator through the static pressure line 10.

The affectiveness with which the instruments of our invention indicate the static pressure when moving through a gaseous medium, may be illustrated by describing a number of determinations made at various Mach numbers. For example, a probe constructed as shown in Fig. 6 with diverging sides, which made an angle of about 0.75° with a centrally located plane, was subjected to air velocities equivalent to a Mach number of 1.2 at 0° angle of attack and 0° angle of yaw. The probe caused the indicator to show a static pressure which was only 0.8 percent in error as compared to the actual static pressure. At an angle of yaw of 2.3° and at 0° angle of attack, the static pressure as measured by this probe was only 0.08 percent in error. When the angle of attack was changed to 6°, at 0° angle of yaw, the static pressure as determined by the probe was the same as the actual static pressure. Changing the angle of attack to 9°, at 0° angle of yaw, changed the error in the pressure indication by 0.7 percent. When the angle of attack was as high as 12°, the error was only about 1.2 percent.

When the sides of the probe diverge by about 0.1° from a centrally located plane, the instrument gives good measurements of the surrounding ambient pressure at a Mach number of about 1.1. When the angle of divergence of the flat outer surfaces is increased to 2°, the instrument is found to give good measurements at a Mach number of about 1.5. When, however, the sides of the instrument are parallel to each other, it is found that the probe functions well at Mach numbers of from about 1.5 to about 1.7.

On the other hand, when the probe is constructed as shown in Fig. 7 with converging sides so as to make an angle of about 2° with planes Y'—Y' and Z'—Z' which are parallel with the centrally located plane X'—X', reliable measurements of static pressure can be obtained at a Mach number of 3. When the angle of convergence of the flat surfaces is 0.1°, satisfactory measurements can be obtained at a Mach number of 1.7. This illustrates that when the probe of this invention has sides which converge by an amount equivalent to from about 0.1° to about 2°, satisfactory measurements of static pressure can be obtained at Mach numbers of from about 1.7 to about 3.

Thus it is seen that the pressure probe of this invention is suitable for measuring static pressures at elevated Mach numbers and is relatively insensitive to a considerable range in the deviation of flight with respect to angles of attack and angles of yaw.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A static pressure measuring device comprising a body having two substantially flat outer surfaces, a first, a second and a third internal chamber in said body, connecting conduit means, said first and second internal chambers in said body open to said third internal chamber through said connecting conduit means, said first internal chamber having apertures leading to one of said flat outer surfaces, said second internal chamber having apertures leading to the other of said two flat outer surfaces; and a static pressure line in said body leading from said third internal chamber to a pressure indicator.

2. A static pressure measuring device comprising a body having two substantially flat outer surfaces, said flat outer surfaces making an angle of from 0 to about ±2° with a plane which at any point on said plane is equidistant from said outer surfaces and which is centrally located in the body of said device, a first and second internal chamber connected by conduit means to a third internal chamber, said first internal chamber having apertures leading to one of said substantially flat outer surfaces, said second internal chamber having apertures leading to the other of said substantially flat outer surfaces; and a static pressure line leading from said third internal chamber to a pressure indicator.

3. A static pressure measuring device comprising a body having two substantially flat outer surfaces, said flat outer surfaces making an angle of from 0 to about ±2° with a plane which at any point on said plane is equidistant from said outer surfaces and which is centrally located in the body of said device, an internal chamber located between said flat outer surfaces, a first partition member positioned in said chamber so as to divide said chamber into a first compartment and a second enclosure, a second partition member positioned in the second enclosure so as to divide said second enclosure into second and third compartments in such a manner that said second and third compartments are bounded in part by said first partition member, said second and third compartments having conduit means leading through said first partition member to said first compartment, said second compartment having apertures leading to one of the said flat outer surfaces, said third compartment having apertures leading to the other of the said flat outer surfaces, and a static pressure line in said body adapted to connect said first compartment to a pressure indicator.

4. A static pressure measuring device comprising a body having two substantially flat outer surfaces, said flat outer surfaces making an angle of from 0 to about ±2° with a plane which at any point on said plane is equidistant from said outer surfaces and which is centrally located in the body of said device, an internal chamber located between said flat outer surfaces, a first partition member positioned in said chamber so as to divide said chamber into a first compartment and a second enclosure, a second partition member positioned in said second enclosure in a plane centrally located between the flat outer surfaces so as to divide said second enclosure into second and third compartments, said second and third compartments having conduit means leading through said first partition member to said first compartment, said second compartment having a plurality of apertures leading to one of said substantially flat outer surfaces which is adjacent to said second compartment, said third compartment having a plurality of apertures leading to the other of said substantially flat outer surfaces which is adjacent to said third compartment, and a static pressure line in said body adapted to connect said first compartment to a pressure indicator.

5. The static pressure measuring device of claim 4 in which the ratio of the total cross-sectional area of said apertures leading to the outer surfaces-to-the total cross-sectional area of the conduit means leading to said first compartment is larger than 2:1.

6. The pressure measuring device of claim 4 to be used to measure pressure of a flowing fluid in which the ratio of the total cross-sectional area of said apertures leading to the outer surfaces-to-the total cross-sectional area of the conduit means leading to said first compartment is from about 2:1 to about 20:1, said device having a reverse delta planform with the base of the delta being upstream in the fluid flow and being shaped to form a sharp wedge-shaped leading edge.

References Cited in the file of this patent
UNITED STATES PATENTS

| | | |
|---|---|---|
| 2,173,688 | Karlsson et al. | Sept. 19, 1939 |
| 2,271,863 | Holm | Feb. 3, 1942 |
| 2,325,018 | Moss | July 20, 1943 |
| 2,662,402 | Ince et al. | Dec. 15, 1953 |
| 2,693,700 | Osborne | Nov. 9, 1954 |
| 2,767,579 | Faget | Oct. 23, 1956 |